W. L. IMLAY.
PROCESS OF EXTRACTING PRECIOUS METALS FROM THEIR ORES.
APPLICATION FILED AUG. 7, 1908.
919,434.
Patented Apr. 27, 1909.
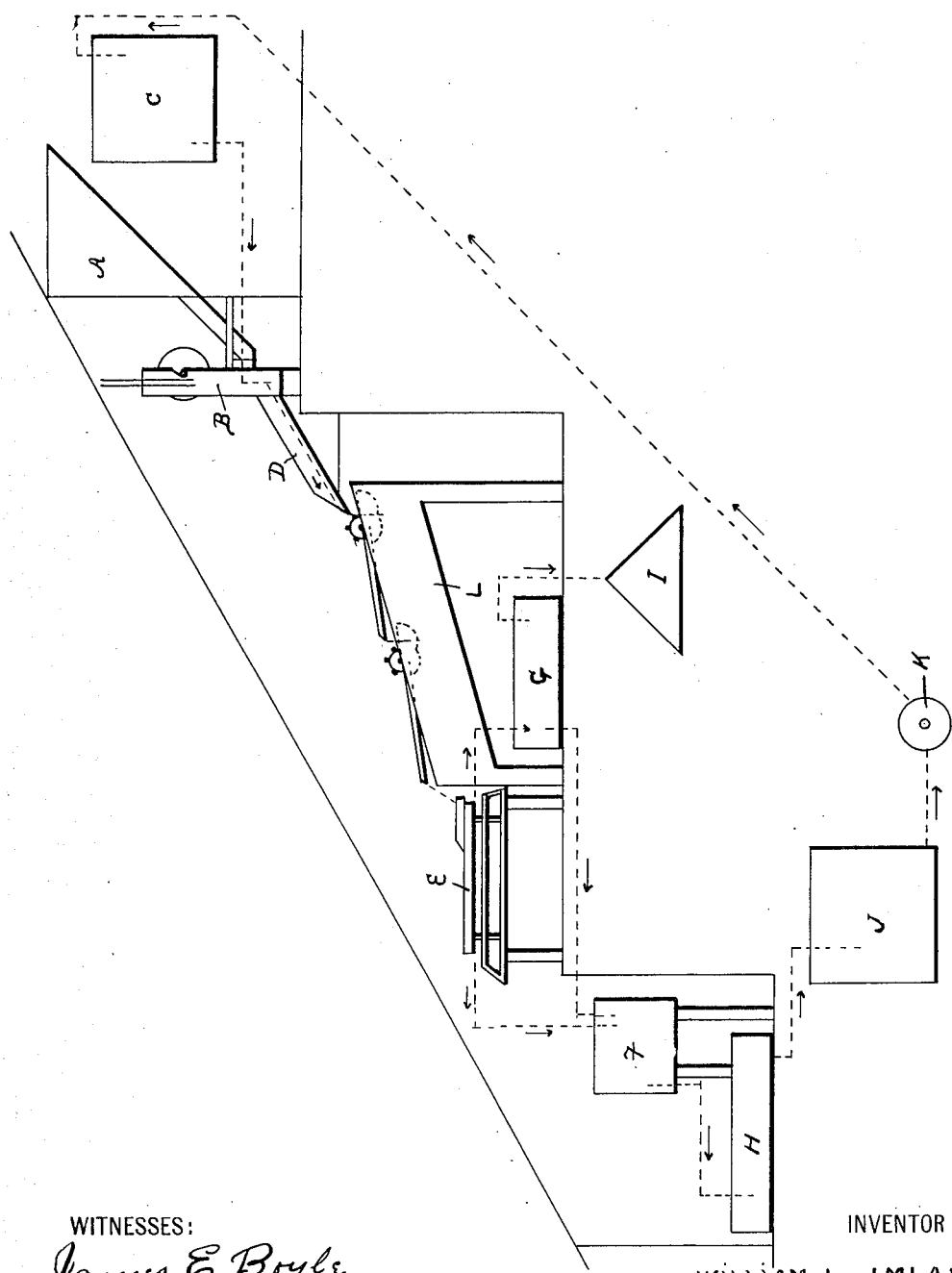
WITNESSES:
James E. Boyle
Mabel L. Lefevre.
INVENTOR
WILLIAM L. IMLAY,
BY John J. Thompson
ATTORNEY

UNITED STATES PATENT OFFICE.

WILLIAM L. IMLAY, OF CONESTOGA, PENNSYLVANIA, ASSIGNOR TO WILLIAM L. IMLAY RAPID CYANIDE PROCESS COMPANY, A CORPORATION OF SOUTH DAKOTA.

PROCESS OF EXTRACTING PRECIOUS METALS FROM THEIR ORES.

No. 919,434.     Specification of Letters Patent.     Patented April 27, 1909.

Application filed August 7, 1908. Serial No. 447,352.

*To all whom it may concern:*

Be it known that I, WILLIAM L. IMLAY, a citizen of the United States, residing at Conestoga, in the county of Lancaster and State of Pennsylvania, have invented certain new and useful Improvements in Processes of Extracting Precious Metals from Their Ores, of which the following is a specification, reference being had therein to the accompanying drawing.

My invention relates to a process for extracting precious metals from their ores, and is an improvement over the present processes involving the use of a solvent of cyanid of potassium or other alkaline cyanid, and it is particularly applicable to the treatment of free milling ores in which the values occur in very fine particles, tailings or concentrates resulting from wet crushing and plate amalgamation, or dry crushing and pan amalgamation, and it can also be applied to the treatment of many of the so-called refractory ores, especially those in which the values occur in such a finely divided form that even amalgamation in pans fails to recover the values, or of ores in which the values are coated with a film of metallic oxid or sulfid rendering them non-amalgamated, and causing the values to resist the dissolving action of the cyanid solution, while under my process the crushed ore or pulp is constantly rubbed while exposed to the action of the cyanid solution in such a manner that the metallic oxid, sulfid or hydrogen film coating of the values is worn away and thus allows the solution to attack the values more readily and more quickly.

The objects of the invention are to simplify the present process, reduce the cost of the plant, labor, and time required, as days of quiet percolating or leaching are reduced to minutes by my process, which is designed to avail of the use of gravity to a great extent as a means of agitation, and moving the pulp, as each step of the process is preferably situated upon a lower level than the preceding one and also the amount of cyanid solvent employed is much less than hitherto.

Another object of the invention is to provide a process in which successive bodies of ore may be continuously treated, and also by this method the leaching or dissolving of the values takes place not only while in suspension, but while in motion, and is greatly aided by artificial changes in temperature, subjection to light friction by falling, friction by rubbing and friction by scouring in the fine sandy pulp, all of which are essential to bring about the rapid dissolving of the values in the cyanid solvent, and as a consequence by this means I am enabled to accomplish one of the important objects of my invention, namely, the shortening of the time necessary to recover the values from a given body of ore, as I have found that the action produced upon the cyanid solution by alternately heating and cooling it while exposed to the light and air, greatly facilitates its dissolving action or affinity for the values contained in the ore.

These and other objects I attain as hereinafter set forth, reference being had to the accompanying drawing in which the figure is a representation, to some extent diagrammatic, of one combination of apparatus for accomplishing my invention, but it is fully understood that the different pieces of apparatus may be of any suitable construction, and that the order of their operations may be changed, so long as they accomplish the steps required by my process.

In the drawing forming part of this specification, I have illustrated a combination of apparatus for carrying out my process, and in this drawing A represents an ore-bin, from which the crushed ore is delivered to a stamp-mill B, which is supplied with a cyanid solvent solution from the stock tank C, so that the ore is here crushed and mixed with the cyanid solvent to a pulp of preferably sixty to eighty mesh and is then delivered from the stamp-mill upon an amalgamating plate D, where the free or coarser values will be deposited, while the finer ore and solvent solution will be delivered upon the first of a series of lixiviators (preferably of my design), which are constructed of a series of plates formed with a depressed receiving end in the form of a riffle box (to gather all minerals of greater specific gravity than the pulp) and trough which is provided with a stirring or agitating drum revolving in said depression and designed to convey the pulp from the riffle or trough to the inclined surface of the plate where it is spread out in a thin layer and where it is heated and cooled and then delivered upon the succeeding plate of the series, where the same action takes place; the number of plates required for the dissolving of the values depending upon the character of the ore treated.

From the lixiviator the ore and solvent solution may be delivered to a concentrator E, which separates the slimes from the coarser ores or sand, but this step may be eliminated as the character of the ore may determine.

The slimes from the concentrator being delivered direct to a filter F, (preferably of my design which provides a lateral filter which can never become clogged by the increasing body of pulp or slime) while the sand is delivered to a percolating tank G, where it is allowed to drain and the drainage containing the values in solution is then carried direct to the zinc precipitating box H, and the sand or tailings delivered to the dump I.

From the filter F, the solvent solution containing the values is delivered to the zinc precipitating box H, where the values are recovered by any well known treatment of the zinc shavings, and the solution is then conveyed to the sump J, and is pumped back to the stock tank A, by the pump K, and is again used as before.

The direction of the solution and pulp is indicated by the dotted lines upon the drawing.

It may here be noted that the coarse values as received from the mill upon the lixiviator will sink to the bottom of the pockets or riffles and thus be retained until dissolved.

Having thus described my invention what I claim as new and desire to secure by Letters Patent is:—

1. The process of treating ores which consists in pulverizing said ores while they are subjected to a solution capable of dissolving the contained values, and alternately heating and cooling said ore and solution while being exposed to light and air, and under agitation.

2. The process of treating ores which consists in subjecting them to the action of a cyanid solution and alternately heating, cooling and agitating said ore and solution while exposed to light and air.

3. The process of treating ores which consists in continuously conveying them through successive bodies of cyanid solution, and alternately heating, and cooling and agitating said ore and solution while exposed to the action of light and air.

4. The process of treating ores which consists in acting upon them by a solution of cyanid while being subjected to rubbing or scouring conducted under changes in temperature and to the action of light and air.

5. The process of treating ores which consists in conveying the pulverized ores in the presence of a solution capable of dissolving therein contained values over a series of lixiviators where said ore and solution are alternately heated, cooled, agitated and scoured while exposed to the action of air.

6. The process of treating ores which consists in subjecting the ore to the action of a solution capable of dissolving the values therein contained, amalgamating said mixture of ore and solution, then conveying said mixture over a lixiviator where same is alternately heated, cooled and agitated while exposed to the action of light and air, then separating said solution from said ore, and then recovering the values from said solution.

7. The process of treating ores which consists in subjecting them to the action of a solution capable of dissolving their values, while being subjected to rubbing or scouring conducted under alternately rising and falling temperature.

8. The process of treating ores which consists in subjecting them to the action of a value dissolving solvent, raising and lowering the temperature of said ore and solvent and by friction caused by allowing the ore to fall, rubbing and scrubbing it.

9. The process of treating ores which consists in subjecting them to the action of a value dissolving solvent and alternately heating and cooling the ore and solvent while exposed to light and air and under frictional agitation by causing the ore to fall, by stirring, by rubbing, and by scouring.

10. The process of treating ores which consists in acting upon them by a solution of cyanid while being subjected to the action of friction by causing the ore to fall, by agitating it, and by scouring, while exposed to the action of air.

In testimony whereof I affix my signature in presence of two witnesses.

WILLIAM L. IMLAY.

Witnesses:
  WM. J. COULTER,
  C. G. GABEL.